United States Patent [19]

Irwin

[11] 4,285,126
[45] Aug. 25, 1981

[54] HYDRAULICALLY ACTUATED APPARATUS

[76] Inventor: Lawrence F. Irwin, 10835 Bellagio Rd., Bel Air, Calif. 90024

[21] Appl. No.: 72,156

[22] Filed: Sep. 4, 1979

[51] Int. Cl.³ .................. B26B 17/00; F15B 15/18
[52] U.S. Cl. .......................... 30/180; 30/182; 60/328; 60/477; 60/481; 285/278; 285/281
[58] Field of Search ............... 60/477, 478, 481, 328; 73/141 R; 91/1; 92/5; 177/141, 146; 254/DIG. 4; 30/180, 182, 228; 285/281, 280, 278

[56] References Cited

U.S. PATENT DOCUMENTS

| | | | |
|---|---|---|---|
| 1,524,361 | 1/1925 | Lowrey | 285/332.3 |
| 1,663,189 | 3/1928 | Bergstrom | 30/182 X |
| 1,928,076 | 9/1933 | Rudolph | 285/281 |
| 2,273,396 | 2/1942 | Couty | 285/278 |
| 2,273,397 | 2/1942 | Couty | 285/278 |
| 2,380,362 | 7/1945 | Hem | 177/146 X |
| 2,477,854 | 8/1949 | Baker | 177/146 |
| 2,561,757 | 7/1951 | Sinner | 285/281 |
| 2,584,431 | 2/1952 | Dearsley | 60/478 X |
| 2,624,112 | 1/1963 | Lazarevich | 30/182 |
| 2,754,108 | 7/1956 | Brown | 177/146 |
| 2,909,367 | 10/1959 | Goehrig, Jr. et al. | 177/146 |
| 3,052,980 | 9/1962 | Fieser | 30/180 X |
| 3,786,677 | 1/1974 | Spontelli | 73/141 R X |
| 3,921,297 | 11/1975 | Vit | 285/281 X |
| 3,922,780 | 12/1976 | Green | 30/180 X |
| 3,992,777 | 11/1976 | Perkins et al. | 30/180 |
| 4,031,619 | 6/1977 | Gregory | 60/477 |

FOREIGN PATENT DOCUMENTS

| | | | |
|---|---|---|---|
| 1375794 | 9/1964 | France | 30/182 |

*Primary Examiner*—Irwin C. Cohen
*Attorney, Agent, or Firm*—James E. Brunton

[57] ABSTRACT

A multipurpose, hydraulically actuated apparatus comprising a piston movable in response to fluid under pressure within walls defining a piston chamber. Actuating fluid is supplied to the piston chamber by a uniquely constructed hand operated fluid pump. The area of the fluid impinging surface of the piston is in multiples of one inch. Accordingly, when the apparatus is used as a hydraulic scale the weight being lifted by the piston can be read directly on a pressure gauge which is calibrated in pounds per square inch and which is connected to the piston chamber below the piston.

The apparatus can readily be converted to function as a cutting device by connecting a U-shaped member to the walls of the unit and by connecting a cutting element to the outer face of the piston. The U-shaped member includes spaced apart arms and a bight portion defining a closed space adapted to encircle the nut which is to be cut. Pressure exerted on the piston will cause the cutting element to move toward the bight portion of the U-shaped member and into pressural engagement with the nut.

A unique pressure tight swivel coupling is provided in the conduit interconnecting the hand pump and the piston chamber so that the latter can swivel freely relative to the hand pump.

A further novel feature of the apparatus of the invention comprises an air tight, fluid carrying collapsible liner which is housed within the hollow body of the hand pump.

9 Claims, 9 Drawing Figures

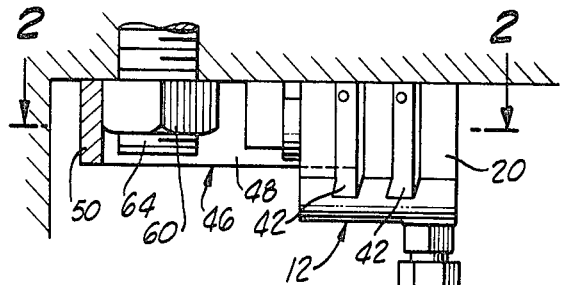
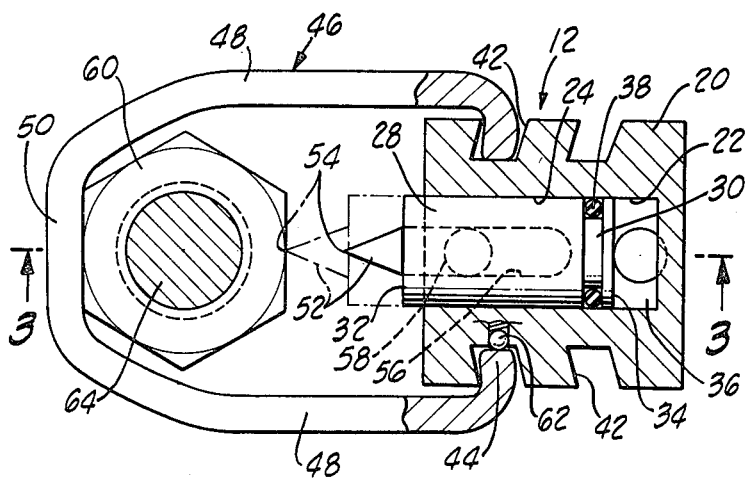
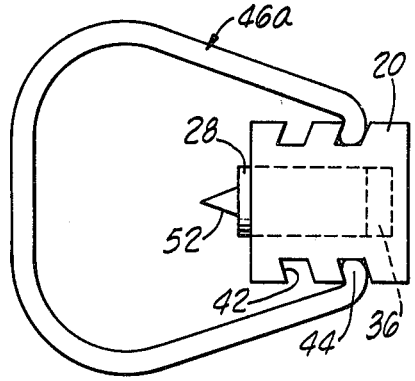
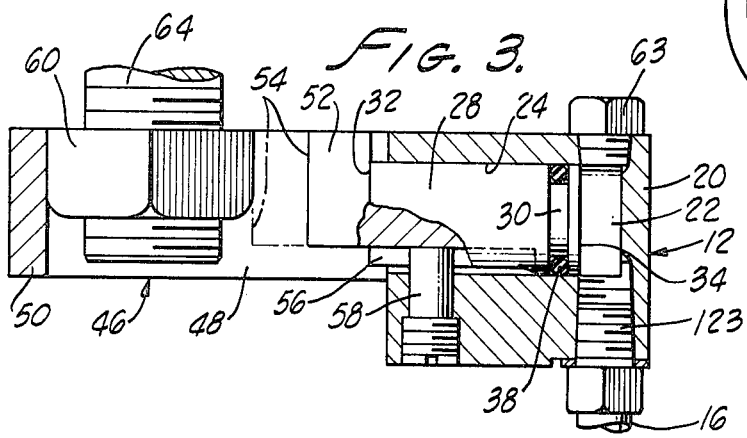

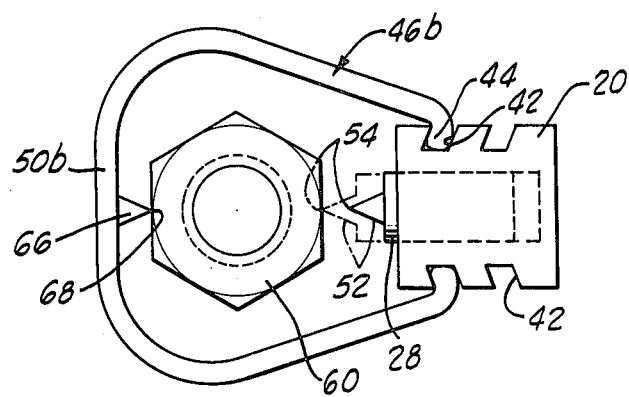
FIG. 5.
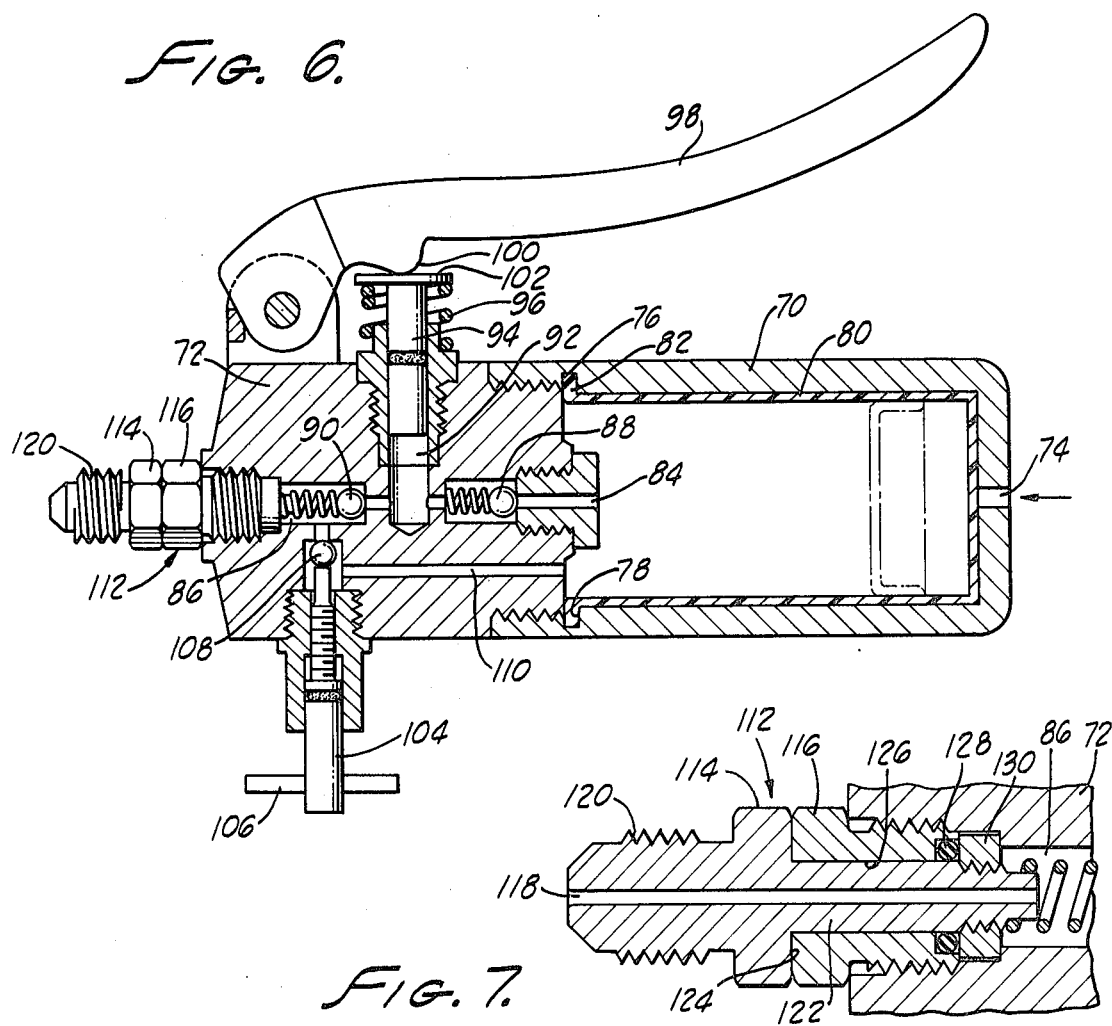
FIG. 6.
FIG. 7.

HYDRAULICALLY ACTUATED APPARATUS

BACKGROUND OF THE INVENTION

1. Field of the Invention

The present invention relates generally to hydraulic devices. More particularly the invention relates to a novel multipurpose hydraulically actuated apparatus which can be used as a hydraulic balance and, with minor modification, also as a plumbers' tool for cutting in situ nuts of various sizes which are threadably connected to water pipes and the like.

2. Discussion of the Prior Art

Typical prior art hydraulically actuated devices comprise a body having a base from which rises a cylindrical wall defining a piston cylinder within which a piston reciprocates in response to fluid pressure exerted thereon. This basic building block has been used for a myriad of purposes such as for hydraulic jacks, hydraulic scales and numerous types of hydraulically operated tools.

Generally, however, this basic unit is built into a single tool which is designed to perform a single function. For example, applicant is familiar with the following patents which describe the use of hydraulic devices to perform weight measurements:

U.S. Pat. No. 2,909,367—Goehring, Jr. et al
U.S. Pat. No. 2,754,108—Brown
U.S. Pat. No. 2,477,854—Backer
U.S. Pat. No. 2,380,362—Hem As will become apparent from the discussion which follows the apparatus of applicant's invention is totally different in construction and mode of operation from prior art devices. Due to its unique design, the apparatus of the present invention can be used for numerous applications including use as a scale, use as a cutting tool and use as a lifting device.

SUMMARY OF THE INVENTION

It is an object of the present invention to provide a highly versatile hydraulic apparatus which can readily be adapted to accomplish several functions. Basically the apparatus comprises a hollow body, or work module, defining a piston chamber, a piston movable within the chamber in response to fluid pressures exerted thereon and an interconnected, freely swiveling hand operated fluid pump for providing fluid under pressure to the piston chamber.

It is another object of the invention to provide an apparatus of the character described in which the lower face of the piston of the work module has an area equal to exactly one square inch and in which a pressure gauge, adapted to measure fluid pressure in pounds per square inch, is connected to the pressure chamber. With this arrangement, the weight of an object lifted by the piston can be read directly in pounds on the gauge.

It is another object of the invention to provide an apparatus of the character described in the initial paragraph in which a U-shaped member can conveniently be removably connected to the outer walls of the hollow body and in which an outwardly extending cutting element can be affixed to the outboard face of the piston. With this arrangement the U-shaped member can be placed around a nut, or other connector in situ and connected to the hollow body. Fluid pressure exerted on the piston by operation of the hand pump will cause the cutting element to controllably move into pressural engagement with the nut so that it can be severed and in this way easily removed from the pipe to which it is threadably connected. Due to the ability of the operator to precisely control the fluid pressure exerted on the piston, the nut can be removed without damage to the stud or pipe upon which it is threaded.

It is another object of the invention to provide an apparatus as described in the previous paragraph in which U-shaped members of various sizes and configurations can be connected to the body at various locations so that the device can readily be used to sever nuts of widely varying diameters.

It is still another object of the invention to provide an apparatus of the character described in the preceeding paragraphs in which the hollow body and the fluid pump are interconnected by an elongated conduit. A novel fluid tight swivel coupling is disposed intermediate the conduit and the hand pump. This uniquely designed coupling permits free swiveling movement between the hollow body and the fluid pump so that the device can readily be used in extremely close quarters.

It is another object of the invention to provide an apparatus of the class described in which the fluid pump embodies a collapsible liner adapted to contain the operating fluid and prevent its contamination by moisture, dirt and other impurities even in the wettest and dirtiest of operating surroundings.

It is still a further object of the invention to provide an apparatus of the aforementioned character which is compact, reliable and easy to use and one which can be readily and inexpensively manufactured.

Additional and more specific objects and advantages of the invention will become apparent from the discussion which follows.

BRIEF DESCRIPTION OF THE DRAWINGS

FIG. 1 is a side elevational view of one form of the hydraulic apparatus of the invention in which the work module thereof is used to cut a nut from a threaded section of pipe.

FIG. 2 is a cross-sectional view taken along lines 2—2 of FIG. 1 showing the internal construction of the work module of this embodiment of the invention.

FIG. 3 is a cross-sectional view taken along lines 3—3 of FIG. 2.

FIG. 4 is a plan view showing another form of generally U-shaped bracket usable in conjunction with the work module of this embodiment of the invention.

FIG. 5 is a plan view of yet another form of generally U-shaped bracket useable in conjunction with the cutter form of work module.

FIG. 6 is a side elevational view, partly in section, showing the details of the internal construction of the hand operated fluid pump of the hydraulic apparatus invention.

FIG. 7 is a side elevational cross-sectional view of the novel fluid-tight swivel coupling of the apparatus of the invention.

DESCRIPTION OF VARIOUS EMBODIMENTS OF THE INVENTION

Figure 8:
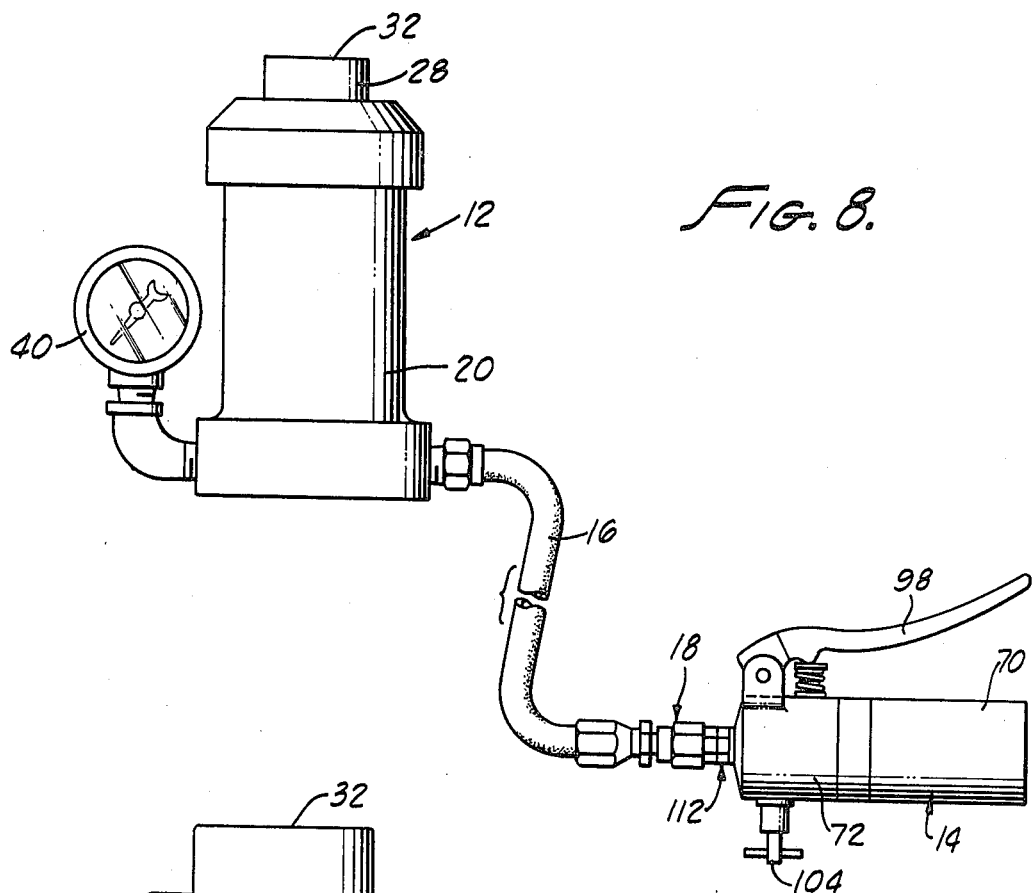
FIG. 8 is a side elevational view of the hydraulic apparatus of the invention showing the work module configured for use as a hydraulic scale.

Referring to the drawings, the basic components of the hydraulic apparatus of the present invention comprise a hydraulically actuated work module 12 and hydraulic means for supplying fluid under pressure to the work module. In the various forms of the invention shown in the drawings, this hydraulic means comprises a hand operated fluid pump 14. Interconnecting the work module and the fluid pump is an elongated fluid conduit 16. Disposed intermediate one end of the conduit and the outlet port of the fluid pump is a novel, fluid-tight swivel 18. Swivel 18, the details of construction of which will presently be described, permits the work module and the fluid pump to freely swivel with respect to each other.

Figure 9:
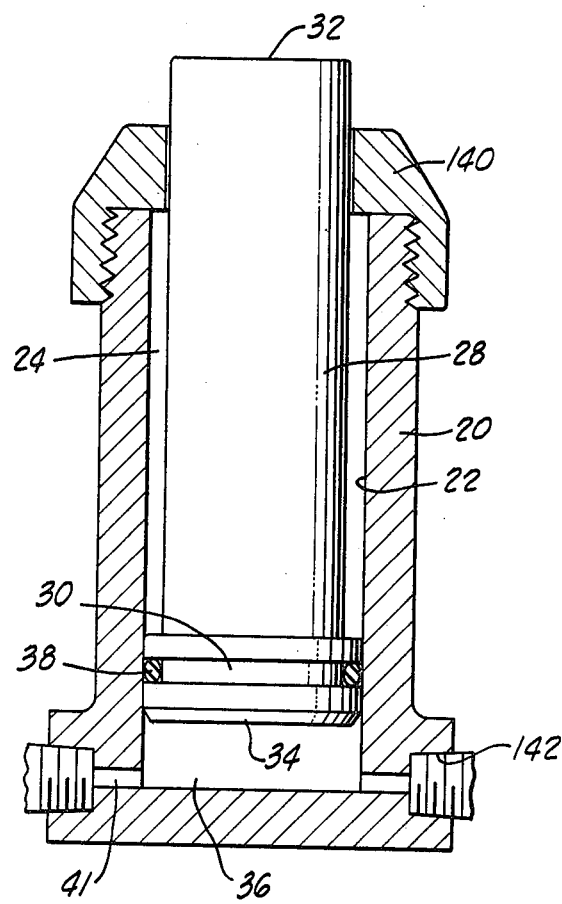
FIG. 9 is an enlarged cross-sectional view of the work module of this form of the invention.

The work module 12 can be variously configured depending upon the work to be done. As best seen in FIGS. 2 and 9, however, the basic work module comprises a hollow body 20 having internal walls 22 defining a piston chamber 24. Reciprocally movable within piston chamber 24 is a cylindrically shaped piston 28. Piston 28 is provided with an annular groove 30 and includes a first surface 32 extending beyond the hollow body. Piston 28 is also provided with a spaced apart opposing surface 34 defining in cooperation with the internal walls of hollow body 20 a pressure chamber 36. When the work module is configured to function as a hydraulic scale as shown in FIG. 9, second surface 34 is constructed so as to have an area precisely equal to one square inch, or equal to even modules of one square inch in area.

An elastomeric ring 38 is carried within annular groove 30 and functions to prevent the passage of fluid between walls 22 and piston 28 as the latter reciprocates within piston chamber 24.

As illustrated in FIG. 8, when the work module of the invention is used as a hydraulic scale, there is provided an hydraulic pressure sensing means shown here as a standard pressure gauge 40 which is appropriately connected to body portion 20 so as to be in open communication with pressure chamber 36 through passage 41. The pressure sensing means functions to sense hydraulic pressure within the pressure chamber and to display said pressure on the appropriately calibrated face of the gauge.

Turning now to FIGS. 1 through 5, the work module of the invention is there shown configured to function as a cutting tool for use in cutting nuts, tubes and other components. The device is particularly useful in severing locking nuts of the type typically used in the connection of faucets to sinks and wash basins.

As best seen in FIG. 2, the body of the work module of this form of the invention is provided with a pair of spaced apart circumferentially extending grooves 42 having slanting side walls. Grooves 42 are adapted to closely receive the inturned end portions 44 of a substantially U-shaped bracket member 46 which can be removably interconnected with body portion 20. Bracket 46 is provided with spaced apart arms 48 which are interconnected by a bight portion 50.

Removably affixed to piston 28 is a cutting element 52 which extends outwardly from face 32 of the piston. In the form of the invention shown in the drawings, cutting element 52 is chisel-like in configuration having a sharp edge 54 extending along its forward extremity. As shown in FIGS. 2 and 3, element 52 is provided with a longitudinally extending slot 56 and is held in alignment within the work module by means of a threaded connector 58 one end of which is receivable in slot 56.

When the work module of the invention is used as a cutting tool, bracket 46 is placed around the nut 60, or other element, which is to be cut and the inturned end portions 44 are inserted in either of the annular grooves 42 as may be appropriate to accommodate the size of the nut 60. A detent arrangement 62 is provided at the bottom of annular grooves 42 to assist in holding bracket 46 in position within the grooves of body 20. Due to the fact that pressure sensing is unnecessary for this application, the pressure gauge receiving opening in body 20 can be sealed by a plug 63 (FIG. 3).

Because of the unique configuration and compactness of the device, it can be efficiently used to sever nuts of various diameters in situ, that is, while still threadably connected to a bolt 64 or to a threaded pipe or the like. As previously mentioned, the device is particularly useful as a plumber's tool for removing locking nuts from the threaded water inlet pipes of faucets interconnected to sinks, washbasins and the like. However, the usefulness of the device is not limited to this application. The tool is also quite useful for cutting nuts in any instance where the nut is located in close quarters, making it difficult to loosen it in a conventional manner with a wrench or other gripping tool.

In operation of the device of this form of the invention, the U-shaped bracket 46 is first placed in position around the nut to be cut and is interconnected with body 20 in either of the grooves 42. Exertion of fluid pressure on the rear surface 34 of the piston will then cause the piston to move outwardly as shown by the phantom lines in FIG. 2, bringing the cutting edge 54 of the cutting tool into pressural engagement with the nut 60. Because of the unique design of the apparatus, and the precise control of the hydraulic pressure which is to be exerted against the piston, the nut can readily be cut without causing damage to the bolt or pipe to which it is affixed.

Referring now to FIG. 4, there is shown another form of generally U-shaped bracket of the invention identified by the numeral 46a. This bracket is used in the same manner as previously described, but provides a larger throat capacity so that it can be emplaced around larger diameter nuts or other elements to be cut.

In FIG. 5 there is shown yet another form of U-shaped bracket of the invention. This bracket, designated by the numeral 46b, is similar in configuration to that shown in FIG. 4 but also includes an inwardly protruding cutting element 66 which is located centrally of the bight portion 50b of the U-shaped bracket. Element 66 includes a cutting edge 68 which is disposed in coplanar relationship with cutting edge 54 on the cutting element 52 carried by piston 28. With this arrangement fluid pressure exerted on the piston 28 will cause it to move outwardly as shown by the phantom lines in FIG. 5 and into pressural engagement with the nut 60. Continued exertion of pressure on piston 28 will cause both cutters 52 and 66 to quickly and efficiently cut the nut 60 at diametrically opposed locations.

The fact that several brackets, as examplified by brackets 46, 46a and 46b, of differing shapes and sizes can interchangably be used with body 20 markedly contributes to the versatility of the device. Further contributing to its versatility and usefulness is the fact that the various brackets can readily be interconnected with the body 20 by insertion of their inturned end portions into either of the grooves 42. These unique features are nowhere suggested by the prior art.

Referring now to FIG. 6, the hand operated fluid pump of the invention comprises a rearwardly extending hollow housing 70 which is threadably connected to a forward body portion 72. Hollow housing 70 is vented to atmosphere at 74 and is counter bored to define a shoulder 76 located proximate its forward end. When housing 70 is threadably connected to body portion 72, shoulder 76 cooperates with the rear surface of the forward body portion to define an annular groove 78.

Receivable within hollow housing 70 is a unique deformable liner or bag 80. Liner 80, which may be constructed of any tough, but flexible material such as polyvinylchloride, functions as a fluid reservoir and is provided with a flange 82 which extends about the periphery of its open end. When liner 80 is in operating position within housing 70, flange 82 is sealably secured within annular groove 78 so as to prevent leakage of fluid between the juncture of housing 70 and body portion 72.

Forward body portion 72 is provided with an inlet passage 84 and an outlet passage 86. Fluid flow through these passages is controlled by check valves 88 and 90 respectively. Disposed intermediate check valves 88 and 90 is a piston chamber 92 which is in communication with passageways 84 and 86. Reciprocally movable within cylinder 92 is a piston 94 which is continuously biased in an outward direction by a biasing means or spring 96. A handle portion 98 is pivotally connected to forward body portion 72 and has a cam surface 100 adapted to operably engage a top surface 102 formed on piston 94.

In operating the fluid pump illustrated in FIG. 6, downward movement of handle 98 will result in downward movement of piston 94 within chamber 92 against the urging of spring 96. Upon releasing handle 98, spring 96 will urge piston 94 outwardly creating a slight vacuum within passageway 84. This vacuum will cause check valve 88 to open and permit fluid to flow from inside liner 80 toward outlet passageway 86 and into the chamber below piston 94. Downward movement of handle 98 will then cause the fluid beneath the piston to be compressed closing check valve 88, opening check valve 90 and permitting the fluid to flow outwardly through outlet passage 86. As illustrated by the phantom lines in FIG. 6, when fluid is removed from liner 80 air from atmosphere will enter housing 70 through vent 74 causing the liner to collapse. Because liner 80 provides a sealed system, however, no air or moisture will be introduced into the operating fluid. This feature represents a significant advance of most prior art fluid pumps which do not embody the novel collapsible liner.

After all the fluid has been pumped from the liner 80 in the manner described valve 104 may be opened by turning handle 106 in a counter clock wise direction. This will permit fluid to flow past closure member 108 and through passage 110 back into liner 80.

Threadably connected within outlet passageway 86 of the fluid pump is a unique swivel member 112. As shown in FIG. 7, this novel fluid tight swivel comprises first and second adapters 114 and 116 respectively. First adapter 114 is provided with a fluid passageway 118 and includes a threaded forward portion 120 adapted to be threadably connected to conduit 16. Adapter 114 has a reduced diameter threaded rearward portion 122 and a shoulder portion 124 disposed intermediate the forward and rearward portions of the adapter. When the fluid pump is connected to the work module, one end of conduit 16 is connected to portion 120 and the other end to threaded opening 123 (FIG. 3) provided in body 20.

Second adapter 116 is threadably receivable in fluid outlet 86 of the fluid pump and is provided with an axial bore 126 adapted to closely receive the rearward portion 122 of first adapter 114. The rearward face of adapter 116 is counterbored and, in cooperation with the rearward portion of first adapter 114, defines an annular groove 128. A keeper means 130 is affixed proximate the rearward extremity of portion 122 of adapter 114 and functions to secure and compress the elastomeric ring within annular groove 128. With this construction the elastomeric ring prevents the passage of fluid between adapters 114 and 116, while at the same time permitting free relative movement between the parts. Accordingly, when the fluid pump and the work module are interconnected in the manner shown in FIG. 1 the work module may be freely swiveled into any convenient position with respect to the hand pump. This unique feature significantly contributes to the ease of use of the apparatus in tight quarters.

Turning now to FIGS. 8 and 9, the work module of the apparatus of the invention is thereshown configured to operate as a hydraulic scale. As previously mentioned, in this configuration piston 28 extends beyond the open end of housing 20 and, as best seen in FIG. 9, protrudes through a threaded cap portion 140 which is threadably connected to the upper end of body portion 20. With the hand operated fluid pump 14 interconnected to the work module in the manner shown in FIG. 8, fluid, under pressure, can be forced through the inlet opening 142 and into chamber 36. In operable communication with chamber 36 is the previously identified pressure sensing means or gauge 40. This gauge will, of course, continuously sense the pressure of the fluid contained within chamber 36 and will continuously reflect the amount of fluid pressure tending to move piston 28 outwardly with respect to body 20.

By making surface 34 of an area which is in equal multiples of one square inch and by appropriately marking the face of gauge 40 it will be appreciated that the weight of any object being lifted by piston 28 can be read directly in pounds on gauge 40. By way of example, if the lower surface 34 of piston 28 has a diameter of approximately 1.128 inches it will then have an area of approximately 1 square inch. If an object weighing 250 pounds were then to be placed upon the upper surface of the piston and fluid under pressure were to be introduced into chamber 36 it follows that 250 pounds of fluid pressure will be required to move the piston and to lift the 250 pound object. Accordingly, when the pressure within chamber 36 is 250 psi, the reading on gauge 40 will reflect 250 pounds, which is the weight of the object supported by the piston.

Similarly, if the surface of the piston 34 were to be made approximately 3.569 inches in diameter it would have an area of 10 square inches. If the same object weighing 250 pounds were then placed on the piston, 25 psi of fluid pressure would be required within chamber 36 to lift the object. By marking the face of gauge 40 so that one psi pressure would reflect a reading of ten pounds on the scale, the weight of the 250 pound object being lifted by 25 psi pressure within chamber 36 could be directly read from the gauge 40.

Conveniently, through the use of simple mathematics, any gauge calibrated in pounds per square inch can be used, with or without the scale being modified to read directly in pounds.

It will be appreciated that this novel form of the hydraulic apparatus of the invention can be used to weight objects such as vehicles, bulky crates and numerous other hard to handle objects. A single work module can be used, or several can be employed to readily weigh particularly large and irregularly shaped objects.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An hydraulically actuated apparatus comprising:
   (a) a hollow body having internal walls defining a piston chamber, said body being provided with at least one groove in the exterior thereof;
   (b) a cylindrically shaped piston reciprocally movable within said piston chamber, said piston being provided with an annular groove and including:
      (i) a first surface extending beyond said hollow body; and
      (ii) a second, spaced apart opposing surface having an area which is in even multiples of one square inch and defining, in cooperation with said internal walls of said hollow body, a pressure chamber;
   (c) an elastomeric ring receivable in said annular groove;
   (d) an hydraulic pressure sensing means connected to said hollow body for sensing hydraulic pressure within said pressure chamber and for displaying said pressure in pounds per square inch;
   (e) hydraulic means connected to said hollow body for introducing fluid under pressure into said pressure chamber to move said piston in a first direction;
   (f) a substantially U-shaped member removably affixed to said hollow body, said member having spaced apart arms interconnected by a bight portion said arms having inturned end portions adapted to be removably received in said groove provided in said body; and
   (g) a cutter element operably associated with said piston whereby movement of said piston in a first direction will cause said cutter element to move toward said bight portion of said U-shaped member.

2. An apparatus as defined in claim 1 in which said hydraulic means comprises a housing having a fluid outlet and includes a conduit connected to said body, said device further including a swivel connection between said conduit and said fluid outlet, said swivel connection comprising:
   (a) a first adapter having a fluid passageway and comprising:
      (i) a threaded forward portion adapted to be threadably connected to said conduit;
      (ii) a reduced diameter, threaded rearward portion; and
      (iii) a shoulder disposed intermediate said forward and rearward portions;
   (b) a second adapter threadably receivable in said fluid outlet of said housing, said second adapter having an axial bore adapted to closely receive said rearward portion of said first adapter and also having a counter bore defining, in cooperation with said rearward portion of said first adapter, an annular groove of predetermined width;
   (c) an elastomeric "O" ring of predetermined cross-sectional diameter receivable in said annular groove, said elastomeric ring having a diameter larger than the width of said groove;
   (d) a keeper means threadably connected to said rearward portion of said first adapter for contstraining and controllably compressing said elastomeric "O" ring within said annular groove.

3. An apparatus as defined in claim 2 in which said housing of said hydraulic means includes a chamber vented to atmosphere, and in which said hydraulic means further comprises:
   (a) an air tight collapsible liner means receivable within said chamber and adapted to contain hydraulic fluid; and
   (b) actuation means operably associated with said liner means for removing fluid therefrom and for forcing the fluid under pressure into said fluid outlet.

4. An apparatus as defined in claim 3 in which said liner means comprises a bag constructed of a yieldably resilient material, said bag being adapted to be sealably mounted within said chamber whereby fluid contained therein will be prevented from escaping to atmosphere.

5. An hydraulically activated cutting device comprising:
   (a) a hollow body having internal walls defining a piston chamber said body being provided with at least one groove in the exterior thereof;
   (b) a piston reciprocally movable within said piston chamber;
   (c) a substantially U-shaped member removably affixed to said body, said member having spaced apart arms interconnected by a bight portion said arms having inturned end portions adapted to be removably received in said groove provided in said body;
   (d) hydraulic means for introducing fluid under pressure into said piston chamber to move said piston in a first direction; and
   (e) a cutter element operably associated with said piston whereby movement of said piston in a first direction will cause said cutter element to move toward said bight portion of said U-shaped member.

6. An hydraulically actuated cutting device as defined in claim 5 in which said cutting element is removably affixed to said piston.

7. An hydraulically actuated cutting device for removing a nut which is threadably connected to a threaded member by cutting the nut, said device comprising:
   (a) a hollow body having a base, external walls and internal walls defining a piston chamber, said external walls having a pair of spaced apart grooves formed therein;
   (b) a reciprocally movable piston sealably carried within said piston chamber, said piston having front and rear walls;
   (c) a substantially U-shaped member having spaced apart arms and a bight portion defining an enclosure adapted to receive the nut to be cut, said arms having inturned end portions adapted to be removably received within one of said grooves formed in said body;

(d) a cutter element carried by said piston having a cutting edge extending outwardly from said front wall; and (e) hydraulic means for introducing fluid under pressure between said base of said body and said rear wall of said piston to urge said cutter element toward said bight portion of said U-shaped member and into pressural engagement with the nut.

8. An hydraulically activated cutting device comprising:

(a) a hollow body having internal walls defining a piston chamber said body being provided with at least one groove in the exterior thereof;

(b) a piston reciprocally movable within said piston chamber;

(c) a substantially U-shaped member removably affixed to said body, said member having spaced apart arms interconnected by a bight portion said arms having inturned end portions adapted to be removably received in said groove provided in said body;

(d) hydraulic means for introducing fluid under pressure into said piston chamber to move said piston in a first direction, said hydraulic means comprising a housing having a fluid outlet and including a conduit connected to said body, said device further including a swivel connection between said conduit and said fluid outlet, said swivel connection comprising:

(1) a first adapter having a fluid passageway and comprising:
   (i) a threaded forward portion adapted to be threadably connected to said conduit;
   (ii) a reduced diameter, threaded rearward portion; and
   (iii) a shoulder disposed intermediate said forward and rearward portions;

(2) a second adapter threadably receivable in said fluid outlet of said housing, said second adapter having an axial bore adapted to closely receive said rearward portion of said first adapter and also having a counter bore defining, in cooperation with said rearward portion of said first adapter, an annular groove of predetermined width;

(3) an elastomeric "O" ring of predetermined cross-sectional diameter receivable in said annular groove, said elastomeric ring having a diameter larger than the width of said groove;

(4) a keeper means threadably connected to said rearward portion of said first adapter for constraining and controllably compressing said elastomeric "O" ring within said annular groove; and (e) a cutter element operably associated with said piston whereby movement of said piston in a first direction will cause said cutter element to move toward said bight portion of said U-shaped member.

9. An hydraulically activated cutting device comprising:

(a) a hollow body having internal walls defining a piston chamber said body being provided with at least one groove in the exterior thereof;

(b) a piston reciprocally movable within said piston chamber;

(c) a substantially U-shaped member removably affixed to said body, said member having spaced apart arms interconnected by a bight portion said arms having inturned end portions adapted to be removably received in said groove provided in said body;

(d) hydraulic means for introducing fluid under pressure into said piston chamber to move said piston in a first direction said hydraulic means including a housing having a fluid outlet and a chamber vented to atmosphere and further comprising:
   (i) an air tight collapsible liner means receivable within said chamber and adapted to contain hydraulic fluid; and
   (ii) actuation means operably associated with said liner means for removing fluid therefrom and for forcing the fluid under pressure into said fluid outlet.

* * * * *